Nov. 12, 1940.     C. W. HEINRICH ET AL     2,221,166
VARIABLE SPEED DRIVE
Filed Aug. 22, 1938     2 Sheets-Sheet 2

Inventors
C. W. Heinrich
E. J. Otto
by
Attorney

Patented Nov. 12, 1940

2,221,166

UNITED STATES PATENT OFFICE 2,221,166

VARIABLE SPEED DRIVE

Casper W. Heinrich, Milwaukee, and Eugene J. Otto, Waukesha, Wis., assignors to Allis-Chalmers Manufacturing Company, Milwaukee, Wis., a corporation of Delaware Application August 22, 1938, Serial No. 226,018

7 Claims. (Cl. 74—230.17)

This invention pertains to a variable speed transmission, particularly a transmission employing one or more V-belts.

It is an object of this invention to provide a variable speed drive of simple and rugged construction. Further objects of this invention are to provide a multiple V-belt variable speed drive, in which the belts maintain their relative spacing and alinement; in which the effective diameters of the sheaves are uniformly and positively varied; in which an idler serves to aid in equalizing belt tension; and in which the casing is constructed of two separable portions, one of which removably supports the sheaves and their adjusting mechanism, and the other of which carries an actuator.

Other objects and advantages will appear from the following detailed description.

A variable speed drive in accordance with this invention comprises two parallel shafts carrying V-belt pulleys, each of the pulleys being provided with one or more V-grooves having an adjustable effective diameter. Variation of effective diameter is effected by axial relative movement between the disks forming the two sides of each belt groove, the slidable disks on each sheave being adjustable simultaneously in the same direction. The means for adjusting each sheave is on the same end of its respective shaft, the two adjusting means being in alinement so that they may be moved simultaneously by a single actuating means. The shaft and sheave are carried in bearings located in a main frame member. An auxiliary frame member, supporting an actuator, is adapted to be fastened to the main frame member. The latter also supports an adjustable resiliently mounted combination idler and fan, the idler aiding in equalization of belt tension, while the fan assists in cooling the unit.

A main or lower casing section 10 is shown as being substantially rectangular in plan. Bearing supports 11 and 12 are carried in suitable semi-circular seats provided in casing section 10, frictionless bearings 13 being carried in said bearing supports. Shafts 14 and 15 are arranged in parallel relationship within said frictionless bearings 13, the shafts, bearings and bearing supports being removable from casing 10 as a unit or cartridge.

Figure 3:
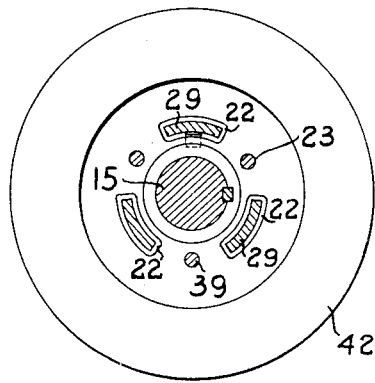
Fig. 3 is a section of one of the shafts taken along the line III—III of Fig. 1.

Each of these shafts carries a variable pitch pulley of the general type disclosed in Otto and Heinrich copending application Serial No. 54,664, filed December 16, 1935. Pulley 17 comprises fixed disks 18, 19 and 20 keyed to the shaft and spaced from each other by integral axial flanges such as 21. As shown in Fig. 3, each of the fixed disks is provided with a plurality of arcuate apertures 22 and intervening circular apertures 23, all of substantially the same radius from the axis of the pulley, and located between the axis of the pulley and the belt coacting surface 24 of each disk. It will be noted that conical belt coacting surface 24 and axial flange 21 are on opposite sides of the disks in sheave 17. Disks 18, 19 and 20 are mounted on shaft 14 and prevented from rotary and axial movement thereon by suitable keys and collars.

Figure 1:
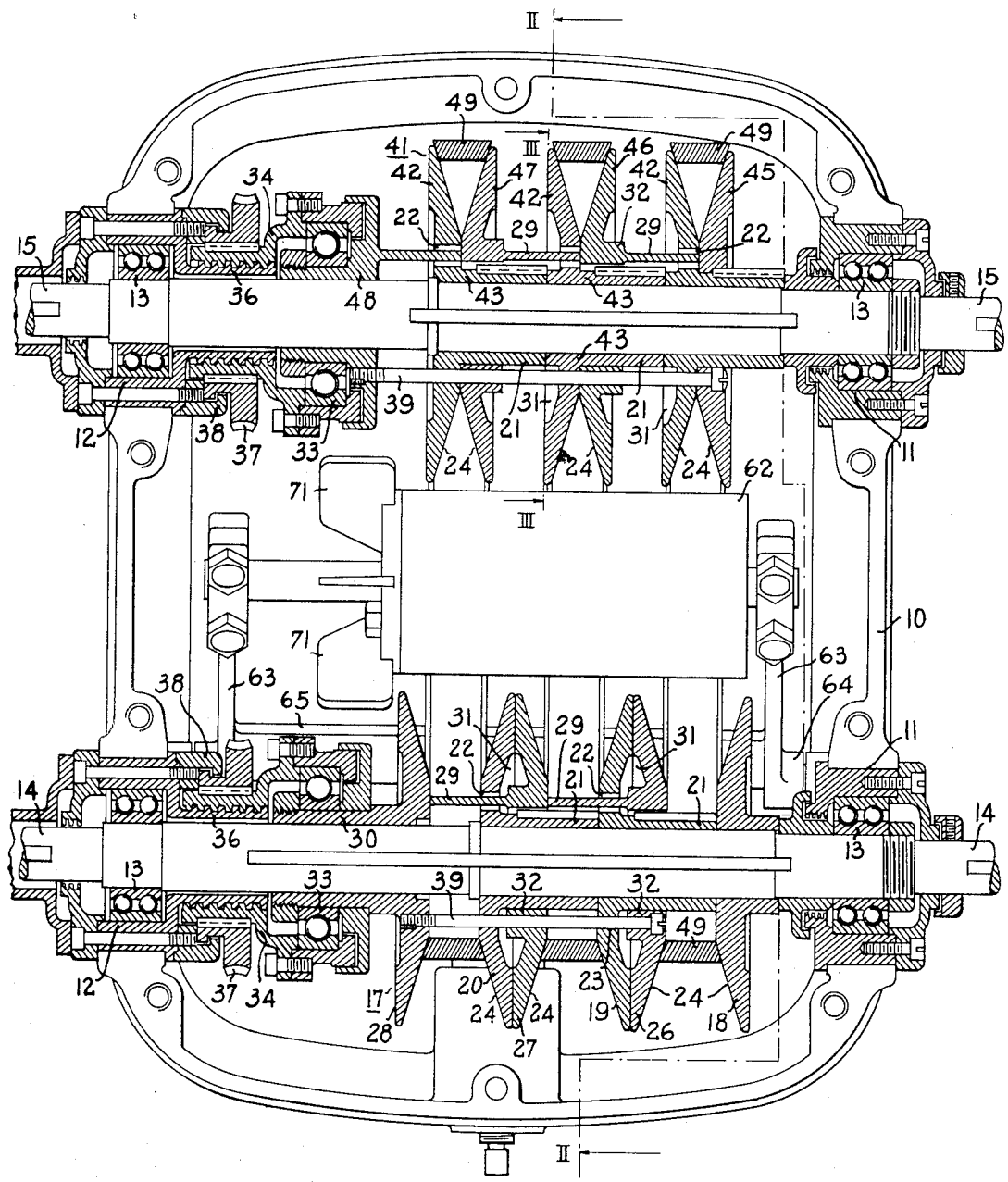
Fig. 1 is a sectional plan view taken along the line I—I of Fig. 2, showing the sheaves, adjusting means, and bearings in section.

Alternating with fixed disks 18, 19 and 20 are a plurality of slidable disks 26, 27 and 28, provided with complementary belt coacting surfaces 24. Intermediate slidable disks 26 and 27 are keyed against rotary movement and are arranged to move freely on axial flange 21 of adjacent fixed disks. On the back of each intervening slidable disk are axial arcuate flanges 29 extending through apertures 22 in an intervening fixed disk to abut an adjacent slidable disk. The end slidable disk 28 is slidably mounted on shaft 14 and carries a long hub 30.

Where compactness is essential, it is difficult to provide sufficient bearing surface between the slidable disks and their support. In disk 26, for example, if this bearing surface were increased by extending the hub of the disk to the right, as seen in Fig. 1, it would be impossible to bring this disk into contact with its cooperating fixed disk to obtain its maximum effective diameter. If the hub of this disk were extended to the left, as seen in Fig. 1, it would interfere with the face of fixed disk 19. This problem is solved by providing fixed disks 19 and 20 with arcuate recesses 31, into which bearing surface bosses 32 fit, thus providing a bearing surface for the slidable disks which is longer in an axial direction than the thickness of the slidable disks. When it is remembered that these disks are subjected to rapid, repeated and considerable axial stresses in service, the importance of this additional bearing surface will be understood.

Fixed to hub 30 of end slidable disk 28 is the inner race of a thrust bearing 33, the outer race of which is carried by split adjusting sleeve 34.

It will be noted that, in use, shaft 14, sheave 17 and inner race of thrust bearing 33 rotate, while the outer race is held stationary. Stationary bearing support 12 is provided with a sleeve 36 through which the shaft 14 passes freely, said sleeve being exteriorly threaded. Adjusting sleeve 34 is internally threaded to threadably engage sleeve 36. Adjusting gear 31 is keyed to adjusting sleeve 34, to rotate therewith, the adjusting sleeve being free to move axially and rotatably with respect to shaft 14. Adjusting gear 37 is restrained against axial movement by any desired means, such as retaining ring 38. The slidable disks 26, 27 and 28 are clamped together by screws or rods 39, which pass freely through intervening fixed disks 19 and 20.

It is clear that if adjusting gear 37 be rotated, adjusting sleeve 34 must rotate with it, and this rotation of adjusting sleeve 34 causes it to advance axially in a direction depending on the direction of rotation. The axial movement of sleeve 34 is transmitted through thrust bearing 33 to hub 30, thus resulting in axial movement of the entire slidable disk unit, to vary the effective pitch diameter of the sheave. During this operation adjusting gear 37 is restrained against axial movement by retaining ring 38.

The other sheave 41 generally resembles sheave 17. It comprises fixed disks 42, provided with belt coacting conical faces 24 and axial hubs or flanges 43; and slidable disks 45, 46 and 47 provided with similar belt coacting surfaces 24 and axial flanges 29 passing through arcuate apertures 22 in the fixed disks. The slidable disks are clamped into a single unit with thrust bearing support 48 by means of screws or rods 39. The thrust bearing, adjusting sleeve, adjusting gear, and bearing support of sheave 41 are similar to those of sheave 17. The sheaves have their grooves in alinement, and are connected by V-belts 49.

Figure 2:
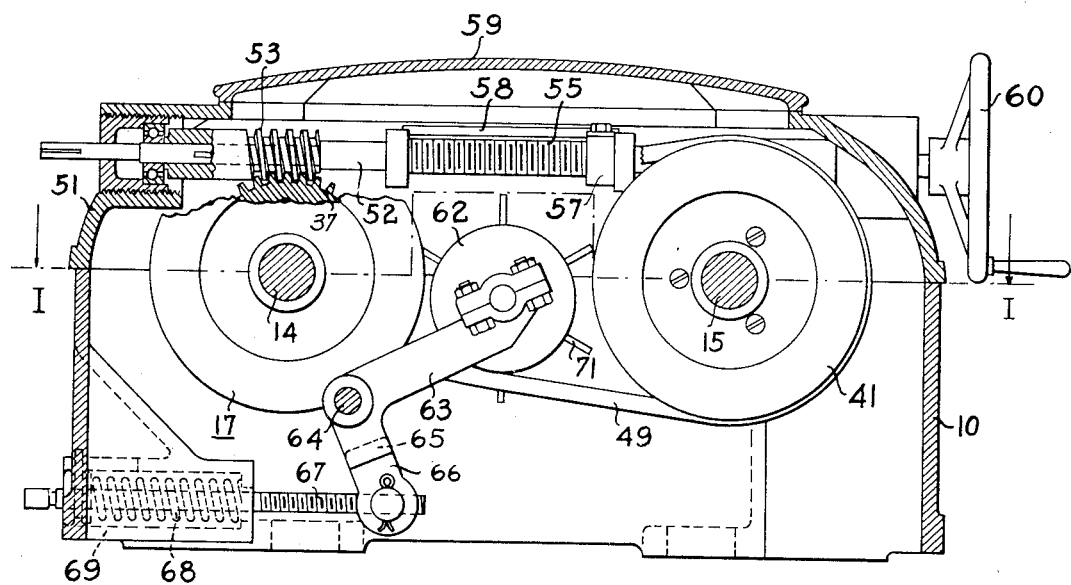
Fig. 2 is a sectional elevation view taken substantially along the line II—II of Fig. 1.

Mounted on main casing section 10 is an upper casing section 51, which is provided with suitable bearing support recesses so that when casing section 51 is fastened to main casing section 10, the two casing sections retain bearing supports 11 and 12 in place between them. When upper casing section 51 is removed, each shaft and its appurtenant bearings, etc. is immediately and easily removable. Upper casing section 51 carries adjusting shaft 52. Two worms 53, of which one is shown in Fig. 2, are carried on adjusting shaft 52 and engage with worm gears 37. It will be seen that by rotating actuator shaft 52 as by means of actuating hand wheel 60, the effective diameter of both sheaves will be adjusted. Rotation of both adjusting gears 37 in the same direction by means of actuator shaft 52 will result in the movement of the slidable disks on both shafts in the same direction. Examination of Fig. 1 will show that movement of the slidable disks of both sheaves in the same direction will change the effective diameter of the sheaves in opposite senses, maintaining the belts in constant alinement. Actuator shaft 52 carries a threaded portion 56 which supports indicator nut 57. Rotation of the actuator shaft 52 causes movement of indicator nut 57 along the threaded portion 56, thereby moving an indicator (not shown) passing through slot 58 along a graduated scale (not shown). In this way the ratios of the diameters of the two sheaves may be indicated at any position of the sheave. A cover 59 is provided for upper casing section 51. Ventilation slots may be provided in the walls of casing 10 and cover 59.

Bearing against the inner side of the belts is an idler 62 which bears upon all of the belts and is supported by arms 63 provided with a fulcrum at 64. The free ends of arms 63 are connected by a cross member 65 which carries intermediate its length a depending arm 66. An adjusting screw 67 is threaded into a cross pin carried by depending arm 66, and is surrounded at the opposite end thereof by a compression spring 68. Spring casing 69 serves also as a guide for adjusting screw 67. Rotation of adjusting screw 67 determines and varies the tension of the spring upon idler 62. An optical indicator for indicating the tension on the idler may be provided. The idler serves not only to take up any variation in belt tension due to increase and decrease of the respective sheaves, but it also serves to help to equalize the tension on the various belts. For example, if one of the belts, being under greater tension, tends to get deeper within its groove, the idler tends to push it outward again, exerting more pressure on it than on the remaining belts. The idler preferably bears against the slack run of the belts. Idler 62 may be provided at one end thereof with fan blades 71 which aid in ventilating and cooling the entire unit.

It will be noted that adequate provision is made for lubricating thrust bearing 33. Lubricant may be introduced into frictionless bearing 13 by any well known means, and flow from there to thrust bearing 33 through the passage provided therefor between shaft 14 and sleeve 36.

The construction described above results in a rugged simple construction for positive actuation and variation of speed. It is obvious that one or more belts may be used in such a transmission, and an automatic motor may be substituted for manually controlled hand wheel 60. Other obvious modifications will occur to those skilled in the art, and are contemplated within the scope of this invention.

It is claimed and desired to secure by Letters Patent:

1. In a variable speed transmission unit, a casing comprising side walls, two shafts supported in parallel relationship in bearing supports in said side walls, the bearing supports in one of said walls being provided with threaded sleeves within said casing, a nut in threaded engagement with each of said threaded sleeves, a variable diameter sheave comprising a plurality of stationary and slidable conical disks carried by each of said shafts, the slidable disks of each sheave being clamped together and connected to said nut on said shaft for axial movement therewith, and means for rotating both of said nuts simultaneously.

2. In a variable speed transmission unit, a casing comprising side walls, two shafts supported in parallel relationship in bearing supports carried by said side walls, the bearing supports in one wall being provided with externally threaded sleeve extensions within said casing, a nut in threaded engagement with each of said threaded sleeve extensions, a pulley comprising fixed and axially slidable conical disks mounted on each shaft, said slidable disks on each shaft being clamped together to move as a unit, means including a thrust bearing for connecting the slidable disk unit with its respective nut for axial movement along its shaft, means on each nut coextensive with each other for rotating said nut, said rotating means being restrained from axial movement.

3. A variable speed unit comprising driving and driven shafts carrying adjustable diameter sheaves, a casing having upper and lower sections, bearing support seats in said lower casing section, bearing supports for said shafts within said seats, cooperating bearing support seats in said upper section, whereby the bearing supports are tightly held in place between said upper and lower sections when said sections are normally fastened together, means on each shaft for adjusting the diameter of the sheave thereon, and a single actuator carried by said upper casing section for simultaneously operating both of said adjusting means, whereby removal of said upper casing section eliminates the actuator and renders the shafts and sheaves easily accessible and removable.

4. A variable pitch pulley comprising a support, a plurality of disks provided with conical faces on one side adjacent the periphery thereof, said disks being fixed on said support and spaced from each other by axial flanges integral with each disk and extending on the conical side of each disk, apertures in said disks between said conical faces and said axial flanges, a plurality of similar disks alternating with said fixed disks and mounted for axial sliding movement on said axial flanges of said fixed disks, said slidable disks being provided with axial spacing flanges integral therewith and extending through said apertures from the face of each disk opposite the conical face thereof, and means for clamping said slidable disks together, said clamping means being at the same radial distance on said slidable disks as said spacing flanges.

5. In a variable speed transmission unit, a casing comprising side walls, two shafts supported in parallel relationship in bearing supports in said side walls, the bearing supports in one of said walls being provided with threaded sleeves within said casing, a nut in threaded engagement with each of said threaded sleeves, a variable diameter sheave comprising two sets of relatively axially movable conical disks carried by each of said shafts, the disks of each set of each sheave being clamped together and one set of each sheave being connected to said nut on said shaft for axial movement therewith, and means for rotating both of said nuts simultaneously.

6. In a variable speed transmission unit, a casing comprising side walls, two shafts supported in parallel relationship in bearing supports carried by said side walls, the bearing supports in one wall being provided with externally threaded sleeve extensions within said casing, a nut in threaded engagement with each of said threaded sleeve extensions, a pulley comprising sets of relatively axially movable conical disks mounted on each shaft, each said set of disks on each shaft being clamped together to move as a unit, means including a thrust bearing for connecting one set of disks of each sheave with its respective nut for axial movement along its shaft, and means on each nut coextensive with each other for rotating said nut, said rotating means being restrained from axial movement.

7. A variable speed unit comprising driving and driven shafts carrying adjustable diameter sheaves, means on each shaft for adjusting the effective diameter of its respective sheave, a single actuator for operating both of said adjusting means simultaneously, a casing comprising separable upper and lower sections enclosing said shafts and sheaves, said actuator being supported by said upper casing section and being removable therewith.

CASPER W. HEINRICH.
EUGENE J. OTTO.